(12) United States Patent
Mandal

(10) Patent No.: US 7,734,960 B2
(45) Date of Patent: Jun. 8, 2010

(54) METHOD OF MANAGING NODES IN COMPUTER CLUSTER

(75) Inventor: Debdayal Mandal, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 437 days.

(21) Appl. No.: 11/878,129

(22) Filed: Jul. 20, 2007

(65) Prior Publication Data

US 2008/0040628 A1 Feb. 14, 2008

(30) Foreign Application Priority Data

Aug. 14, 2006 (IN) .................. 1441/CHE/2006

(51) Int. Cl.
*G06F 11/00* (2006.01)
(52) U.S. Cl. .......................... 714/43; 714/48
(58) Field of Classification Search ............... 714/4, 714/47, 48; 709/209, 220, 224
See application file for complete search history.

(56) References Cited

U.S. PATENT DOCUMENTS

| 7,284,142 | B2 * | 10/2007 | Noha et al. .................. 713/502 |
| 7,421,478 | B1 * | 9/2008 | Muchow ..................... 709/209 |
| 7,437,386 | B2 * | 10/2008 | Callahan et al. ............. 707/200 |
| 7,496,646 | B2 * | 2/2009 | Casper et al. ................ 709/223 |
| 2002/0049845 | A1 * | 4/2002 | Sreenivasan et al. ........ 709/226 |
| 2003/0177228 | A1 * | 9/2003 | Vigouroux et al. .......... 709/224 |
| 2007/0006015 | A1 * | 1/2007 | Rao et al. ..................... 714/4 |

* cited by examiner

*Primary Examiner*—Dieu-Minh Le

(57) ABSTRACT

A method is described of managing nodes in a computer cluster comprising: each node repeatedly broadcasting a cluster summary message; a cluster coordinator node identifying failed nodes by analysing cluster summary messages received from other nodes in the cluster; and the cluster coordinator node broadcasting an updated cluster organization status, if failed nodes are identified. In at least preferred embodiments, the broadcasts can be transmitted using an ad-hoc wireless network.

15 Claims, 9 Drawing Sheets

700

METHOD OF MANAGING NODES IN COMPUTER CLUSTER

This application claims priority from Indian patent application 1441/CHE/2006, filed on Aug. 14, 2006. The entire content of the aforementioned application is incorporated herein by reference.

BACKGROUND OF THE INVENTION

A computer cluster is a parallel or distributed system that comprises a collection of interconnected computer systems or servers that is used as a single, unified computing unit. Members of a cluster are referred to as nodes or systems. The cluster service is the collection of software on each node that manages cluster-related activity. The cluster service sees all resources as identical objects. Resources may include physical hardware devices, such as disk drives and network cards, or logical items, such as logical disk volumes, TCP/IP addresses, entire applications and databases, among other examples. By coupling two or more servers together, clustering increases the system availability, performance and capacity for network systems and applications.

Clustering may be used for parallel processing or parallel computing to simultaneously use two or more CPUs to execute an application or program. Clustering is a popular strategy for implementing parallel processing applications because it allows system administrators to leverage already existing computers and workstations. Because it is difficult to predict the number of requests that will be issued to a networked server, clustering is also useful for load balancing to distribute processing and communications activity evenly across a network system so that no single server is overwhelmed. If one server is running the risk of being swamped, requests may be forwarded to another clustered server with greater capacity. For example, busy Web sites may employ two or more clustered Web servers in order to employ a load balancing scheme. Clustering also provides for increased scalability by allowing new components to be added as the system load increases. In addition, clustering simplifies the management of groups of systems and their applications by allowing the system administrator to manage an entire group as a single system.

Clustering may also be used to increase the fault tolerance of a network system. If one server suffers an unexpected software or hardware failure, another clustered server may assume the operations of the failed server. Thus, if any hardware of software component in the system fails, the user might experience a performance penalty, but will not lose access to the service.

Known cluster services include Microsoft Cluster Server (MSCS), designed by Microsoft Corporation for clustering for its Windows NT 4.0 and Windows 2000 Advanced Server operating systems, and Novell Netware Cluster Services (NWCS), among other examples. For instance, MSCS supports the clustering of two NT servers to provide a single highly available server. Clustering Services are built-in to Microsoft Windows Server 2003.

Clustering may also be implemented in computer networks utilizing storage area networks (SAN) and similar networking environments. SAN networks allow storage systems to be shared among multiple clusters and/or servers. The storage devices in a SAN may be structured, for example, in a RAID configuration.

In order to detect system failures, clustered nodes may use a heartbeat mechanism to monitor the health of each other. A heartbeat is a signal that is sent by one clustered node to another clustered node. Heartbeat signals are typically sent over an Ethernet or similar network, where the network is also utilized for other purposes.

Failure of a node is detected when an expected heartbeat signal is not received from the node. In the event of failure of a node, the clustering software may, for example, transfer the entire resource group of the failed node to another node. A client application affected by the failure may detect the failure in the session and reconnect in the same manner as the original connection.

Interconnects, switches or hubs used for heartbeat message exchanges in a cluster are subject to failures. When such interconnects, switches or hubs fail, cluster integrity is lost as the membership of the cluster becomes unknown. Each node or a set of nodes will then try to re-form the cluster separately. If this were allowed to occur, there would be the potential to run the same application in two or more different locations and to corrupt application data because different instances of an application could end up simultaneously accessing the same disks. This problem becomes more complicated for large clusters because interconnects, switches or hubs are physically separate hardware devices and pin-pointing their failure is quite difficult and sometimes impossible for the cluster nodes.

Currently, redundant interconnects and a quorum device like a lock disk or quorum server are often used to manage such situations.

BRIEF DESCRIPTION OF THE DRAWINGS

Preferred embodiments of the invention will now be described, by way of examples only, with reference to the accompanying drawings in which.

DETAILED DESCRIPTION OF THE PREFERRED EMBODIMENTS

There will be described a heartbeat exchange mechanism for detecting failures within a computer cluster using an ad hoc wireless network.

Wireless or mobile networks are telephone or computer networks that use radio as their carrier or physical layer. Wireless networks use air as a medium for sending messages/receiving and/or signals in a given frequency band which is normally fixed for a given system.

A mobile ad-hoc network (MANET) is a self-configuring network of mobile routers (and associated hosts) connected by wireless links in an arbitrary topology with minimal configuration. As is well known, the IEEE 802.11 ("Wi-Fi") wireless protocol incorporates an ad-hoc networking system when no wireless access points are present. The IEEE 802.11 system only handles traffic within a local group of wireless devices. Each node transmits and receives data, but does not route anything between the network's systems.

Message redundancy is inherent in wireless network systems. Especially in ad hoc wireless network applications, hosts normally operate under in a promiscuous receiving mode. In other words, when a node sends a message all its immediate neighbors may hear the message regardless of whether or not they are the intended recipient of the message. Therefore the effect of sending a message to a neighbor is equivalent to that of a broadcast or multicast to all the neighbors.

Figure 1:
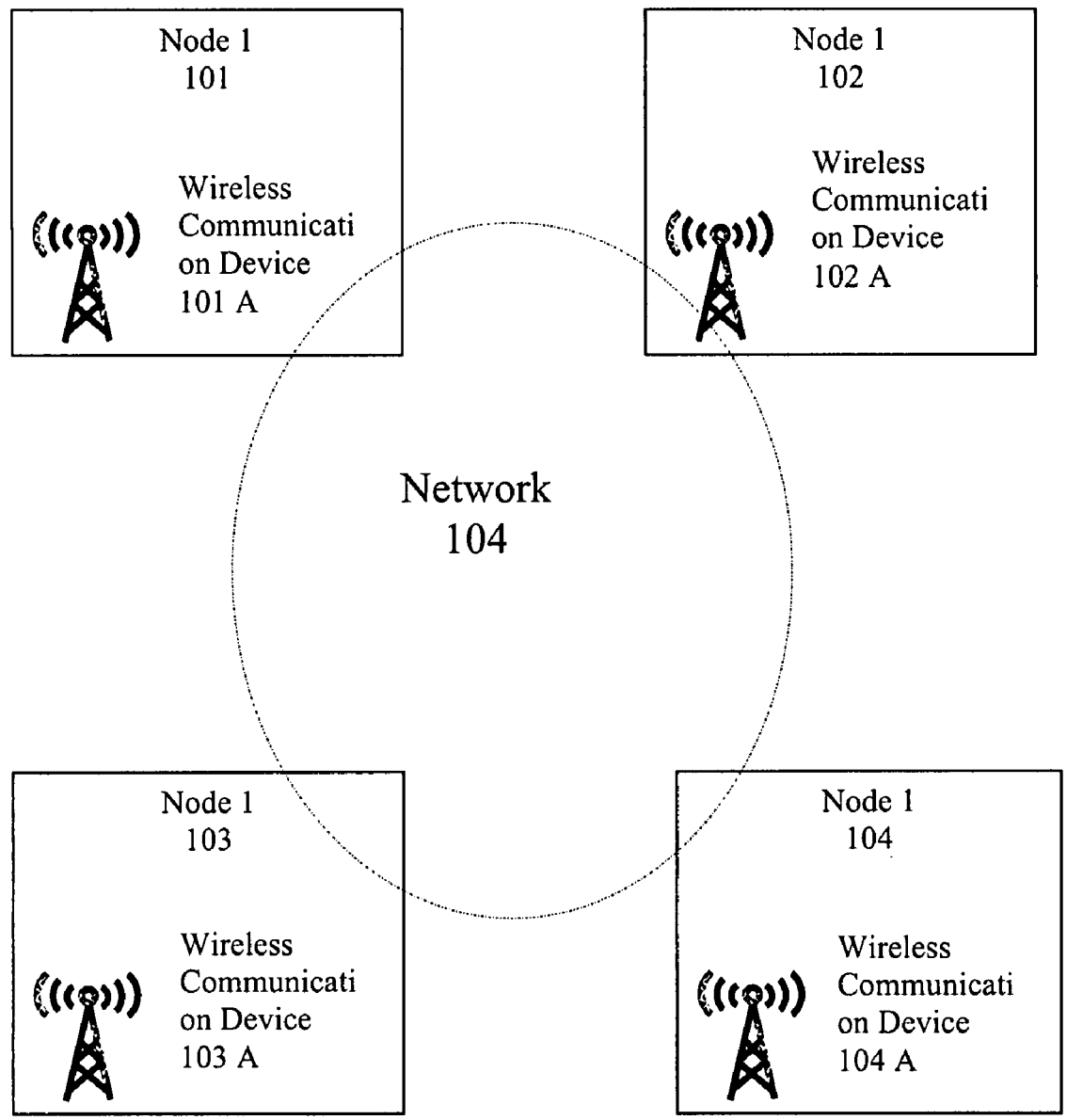
FIG. 1 is a schematic diagram showing a node of a cluster system.

FIG. 1 is a schematic diagram depicting a high-availability cluster. Four nodes are shown in this in the diagram but, of course, any number of nodes could be present according to the size of the cluster involved. A conventional cluster includes multiple nodes and a network or network mesh (typically an Ethernet network) interconnecting the nodes. The nodes are typically provided with additional signaling hardware for sending messages. In the system shown in FIG. 1, in addition to inter-node communications via the network 104, independent inter-node communication of status information is enabled by way of a separate communication channel via a wireless network. This allows for rapid and reliable exchange of node status data as will be described in more detail in the following description.

Figure 2:
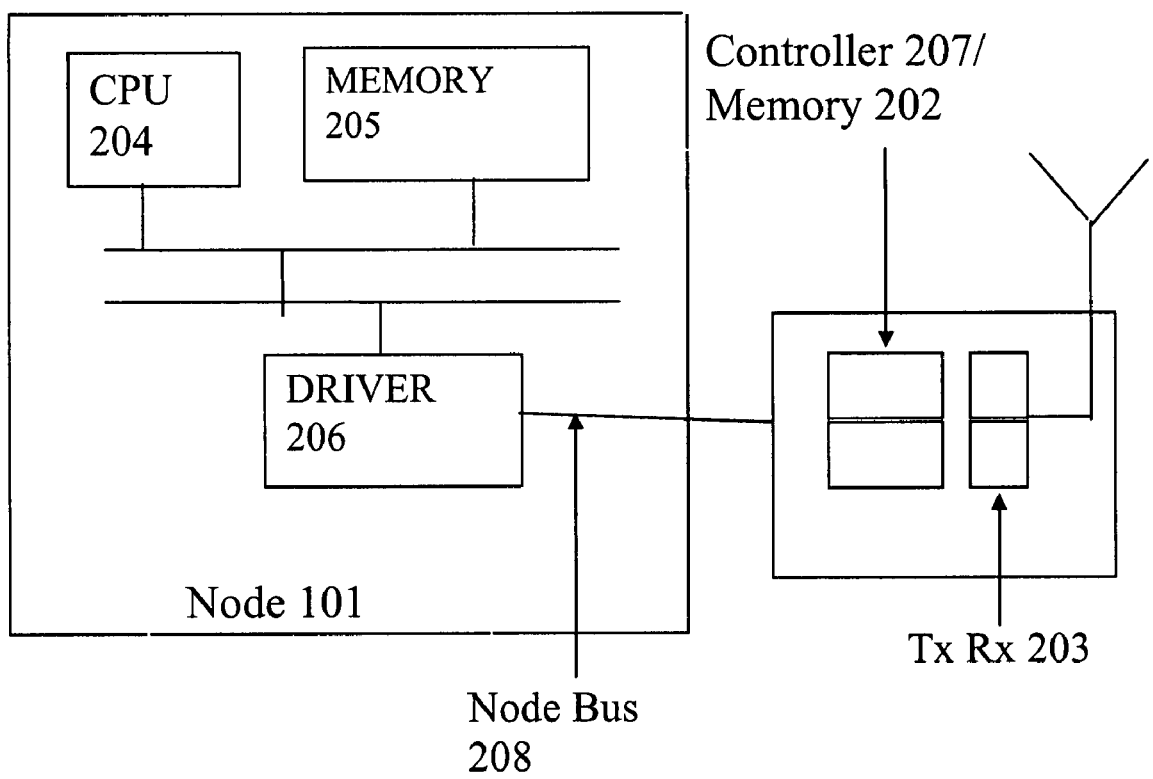
FIG. 2 is a schematic diagram showing a node of a cluster system.

FIG. 2 is a schematic diagram showing a node 101 of a cluster 100 in more detail.

Node 101 includes a conventional computational subsystem and hardware circuitry for exchanging messages and/or status signals connected to the computational subsystem via node bus 208. The computational subsystem comprises computational elements, typically including one or more central processing units (CPUs) 204, memory device 205, and so on. The computational subsystem generates and outputs, among other signals, a subsystem status signal indicating status of the node. The hardware circuitry for exchanging messages receives the subsystem status message and outputs a node status message. The node status message may include a heartbeat message and a summary message. The heartbeat message may be transmitted conventionally via network 104 so that the heartbeat information of all nodes in the cluster is on the network 104. These messages are described in more detail below in relation to the subsequent figures.

The hardware circuitry for exchanging messages may include a controller device 207, memory device 202, a transceiver device 203 and a suitable antenna. In some systems more than one transceiver device may be provided for redundancy or other reasons. The controller device 207 is connected to node 101 via node bus 208. The memory device 202 may be loaded with software for updating and transmitting the status of the present node; monitoring and analyzing status data from another node in the cluster; and taking appropriate action based on the status data from the node being monitored as will be described in the following.

In an ad hoc wireless network, nodes may use transceiver devices 203 to communicate with other nodes. There is no need for any hardware which is not controlled or monitored by the local nodes themselves.

In wireless networks, message loss is by necessity provided for because such systems are designed so that many wireless devices may work in proximity to each other and there may be other wireless signals and noise present in the environment.

Figure 3:
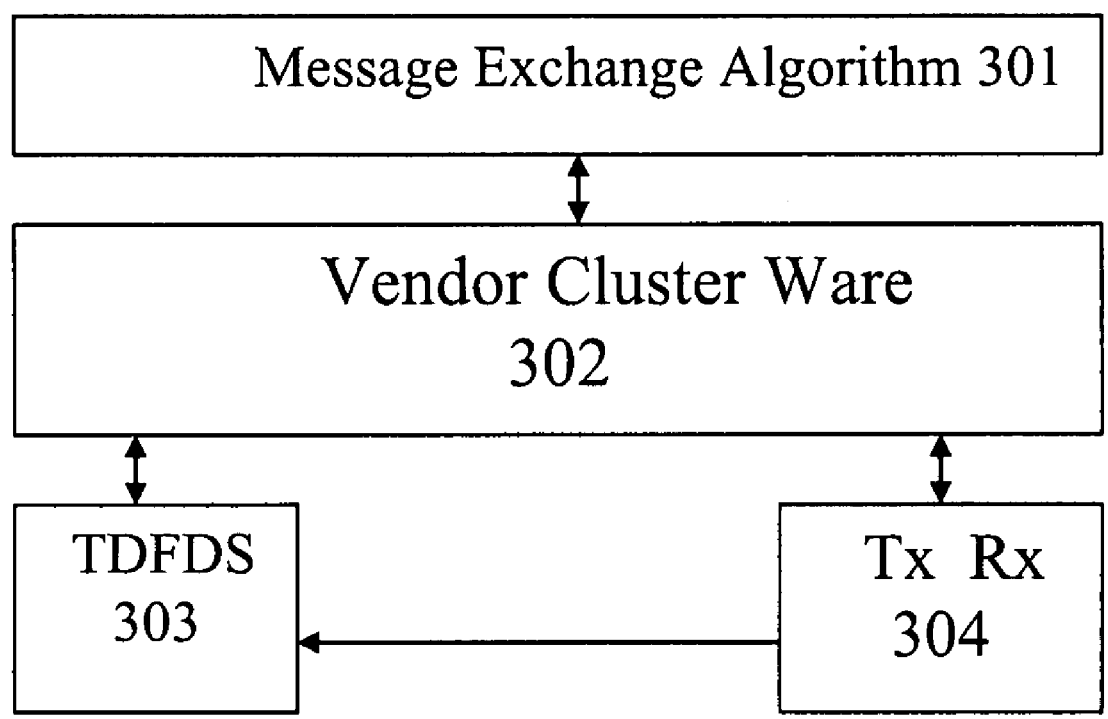
FIG. 3 is a schematic diagram of an apparatus for managing nodes in a cluster system.

FIG. 3 illustrates a software system 300 that may be implemented in each node. The system 300 consists of conventional clustering software 302, such as Microsoft Cluster Server (MSCS), a transceiver driver 304 and a transceiver device fault detection service (TDFDS) 303. Also provided is message exchange Algorithm 301.

In one configuration of the present technique, the message exchange algorithm 301 provides a messaging service to clustering software 302. Transceiver Device Fault Detection Service (DFDS) 303 and transceiver driver 304 are connected through node bus 208 to clustering software 302 and are controlled by it.

Transceiver Device Fault Detection Service 303 is arranged to continuously monitor the transceiver devices 203 present in the node and to report the status of the transceiver devices to clustering software 302, as and when necessary. Transceiver Device Fault Detection Service 303 is thus provided with an arrangement to provide the status of the transceiver device 304 to clustering software 302. For correct operation of Transceiver Device Fault Detection Service 303 two properties are defined and these properties should not be violated at any point of time for proper results. The properties are listed below:

i) Accuracy: TDFDS 303 should not suspect any device. That means false detection may not be allowed.
ii) Completeness: Any kind of failure within the device (even a sub-component failure) may be treated as device failure and should be immediately reported.

If transceiver device 203 is not functioning properly then TDFDS 303 will report this fact to clustering software 302. If a transceiver device is not operating properly, the clustering software 302, depending on the input from the Transceiver Device Fault Detection Service 303, will direct the message to be sent through other communication channels. If there is no other communication channel provided at the node then the clustering software 302 may run the applications on that particular node for a specified time and then stop the applications declaring the node as failed node.

Wireless transceiver device 203 has a limited range i.e. wireless transceiver device 203 cannot communicate with any device which is not in its transmission range.

Figure 4:
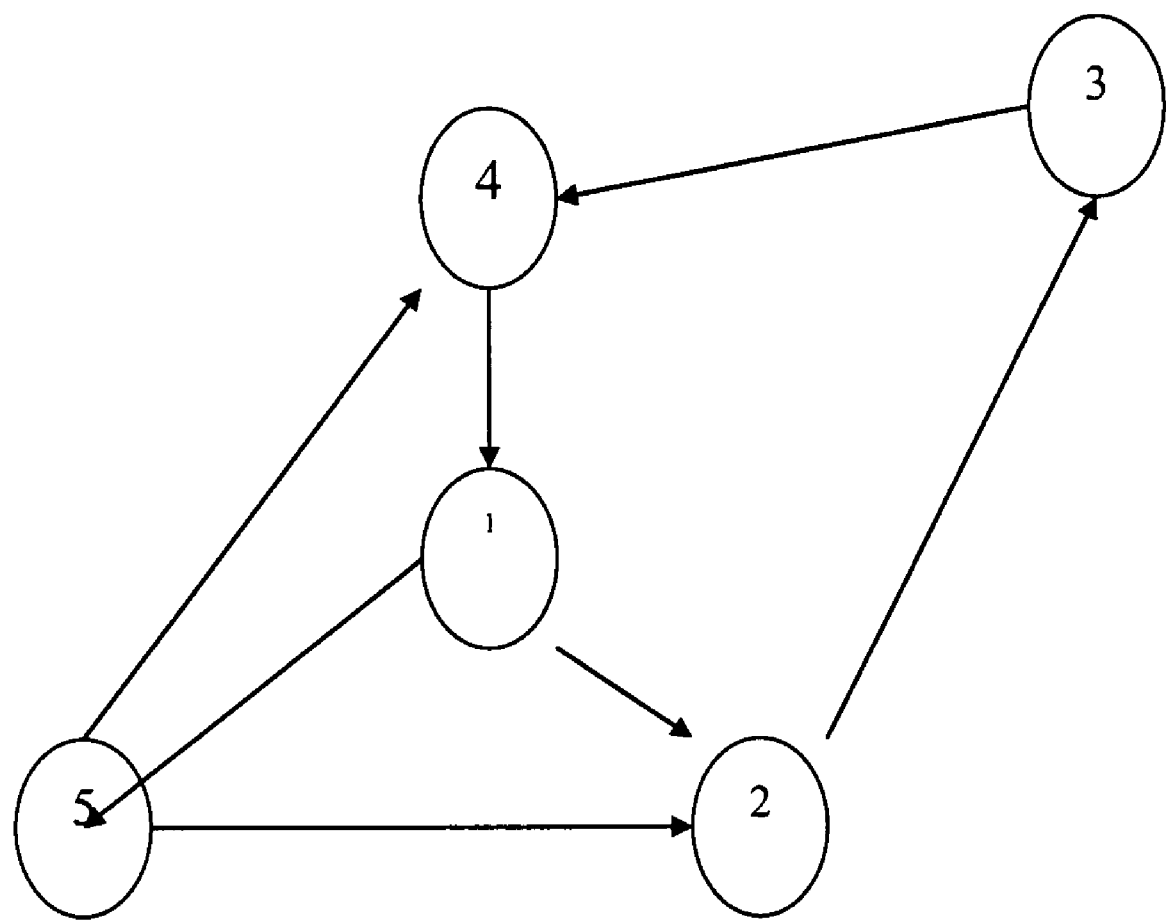
FIG. 4 is a schematic diagram illustrating the message exchange pattern of a cluster.

FIG. 4 illustrates a cluster in which nodes 2, 4 and 5 are in the transmission range of transceiver device 203 installed at node 1 while node 3 is out of the transmission range of transceiver device installed at node 1. Since, in ad-hoc mode, wireless transceiver devices do not direct messages to any particular node, each message may be heard or overheard by all the transceiver devices in the transmission range of original transceiver device.

A message exchange algorithm 301 for exchanging heartbeat messages between nodes will now be described.

Figure 5:
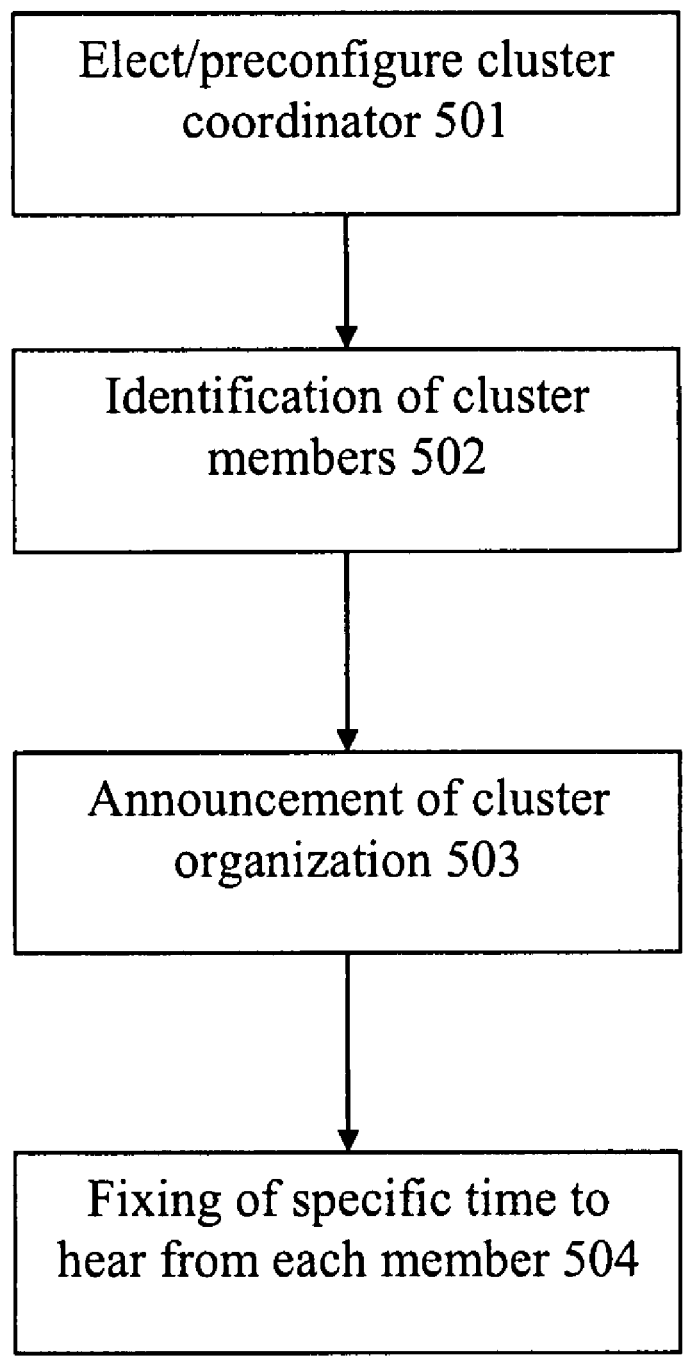
FIG. 5 is a schematic diagram of an algorithm illustrating initial cluster formation.

FIG. 5 is a flow diagram illustrating steps of initial cluster organization in accordance with the present technique. In a given cluster, a cluster coordinator 501 is elected. This cluster coordinator 501 may be pre-configured and/or self-elected. The rest of the nodes in the cluster are assigned a priority with respect to each other forming a priority list. Cluster coordinator 501 when elected; identifies cluster members i.e. all the active nodes in the given cluster 502 and broadcasts a cluster organization announcement 503 which is received by members of the cluster. Hence every cluster member has an initial view of all of the other cluster members and their status i.e. a cluster summary. Furthermore cluster coordinator 501 may determine the time duration 504 during which it should receive a heartbeat from each node during each iteration. This service starts to execute at every heartbeat interval.

Figure 7:
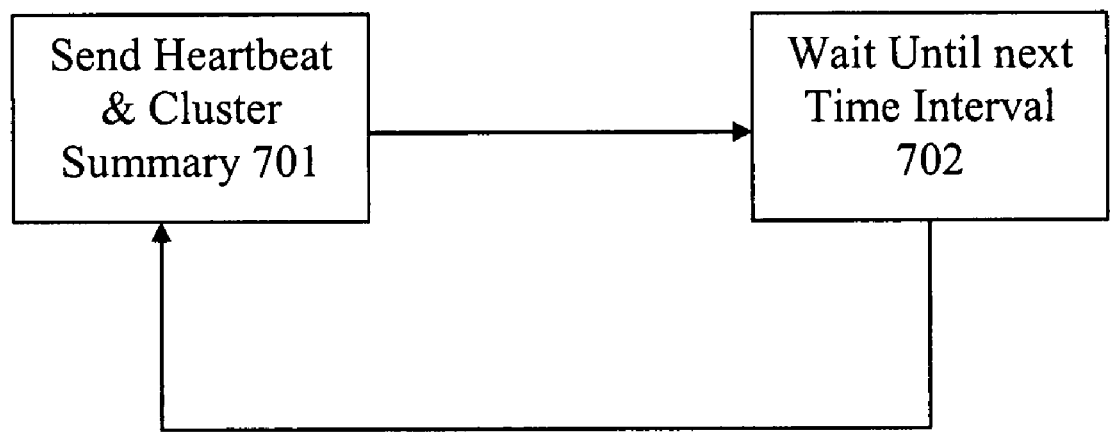
FIG. 7 is a schematic diagram of an algorithm for fixing of hearing cycles for each node.

FIG. 7 illustrates the operation of each node during iterations according to an embodiment of present technique. Each node sends heartbeat message and cluster summary message 701 to the cluster coordinator for the specified time interval and then waits for the next cycle time interval 702.

Figure 6:
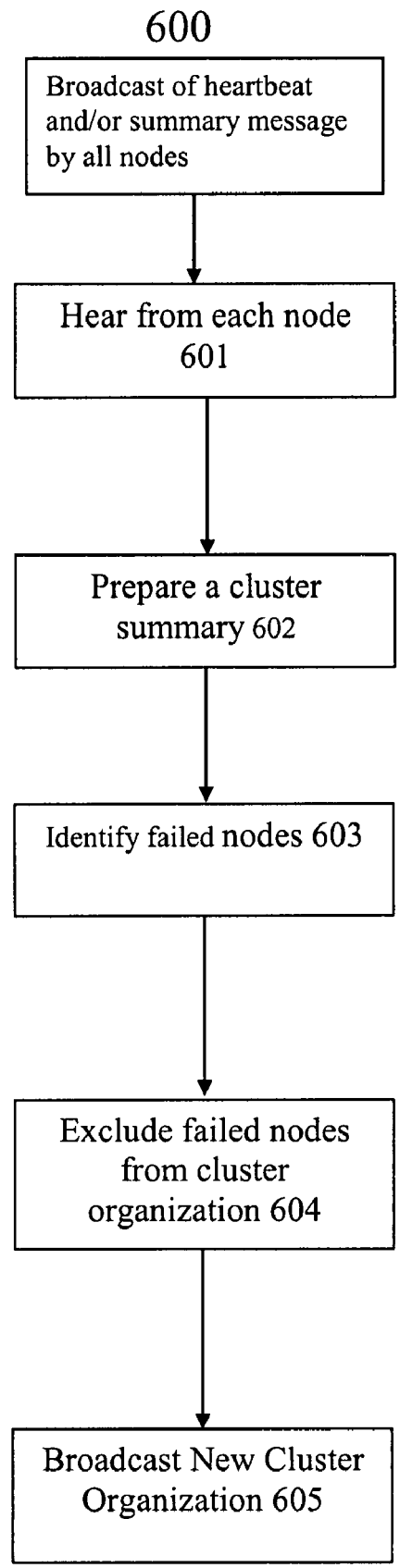
FIG. 6 is a schematic diagram of an algorithm for managing nodes in a cluster system.

FIG. 6 is a flow chart showing the different steps for detection of failed nodes and reorganization of the cluster by cluster coordinator. After the formation of initial cluster organization 500, all nodes in the cluster (including the coordinator) may broadcast a heartbeat message, which contains that node's identity and health status information. All the nodes in the cluster receive this broadcast from the other nodes which are in the transmission range of that particular node. After receiving these messages from each node 601, every node in cluster organization prepares a cluster summary and broadcasts a cluster summary message. Nodes which are not within transmission range of each other are dependent on indirect messages i.e. they receive the heartbeat message from nodes outside their transmission range from the cluster summary broadcast of one of the nodes which is range of both the nodes. For instance, with reference to FIG. 4, the cluster coordinator (node 1) receives the heartbeat message of node 3, which is out of range, from the cluster summary message of node 4 and node 2.

Every node in the cluster sends to the cluster coordinator a cluster summary 602 message that enumerates the nodes in the cluster which the sender hears or overhears during each heartbeat broadcast. This message is also received by all other nodes and can be used to update their own summary message. This decentralizes the task of fault management helps the cluster coordinator to offload its responsibility.

The cluster coordinator classifies nodes as failed nodes or healthy nodes by analyzing the heartbeat and cluster membership summary information received from nodes in its range. Cluster coordinator 501 identifies failed nodes in step 603 according to the failure detection algorithm 800 illustrated in FIG. 8.

Cluster coordinator 501 then organizes, in step 604, the rest of the nodes excluding those classified as failed and then broadcasts—step 605—an update of the cluster health status which indicates the new cluster organization. This message is forwarded to all other nodes in the cluster irrespective of whether they are in or out of the transmission range.

Figure 8:
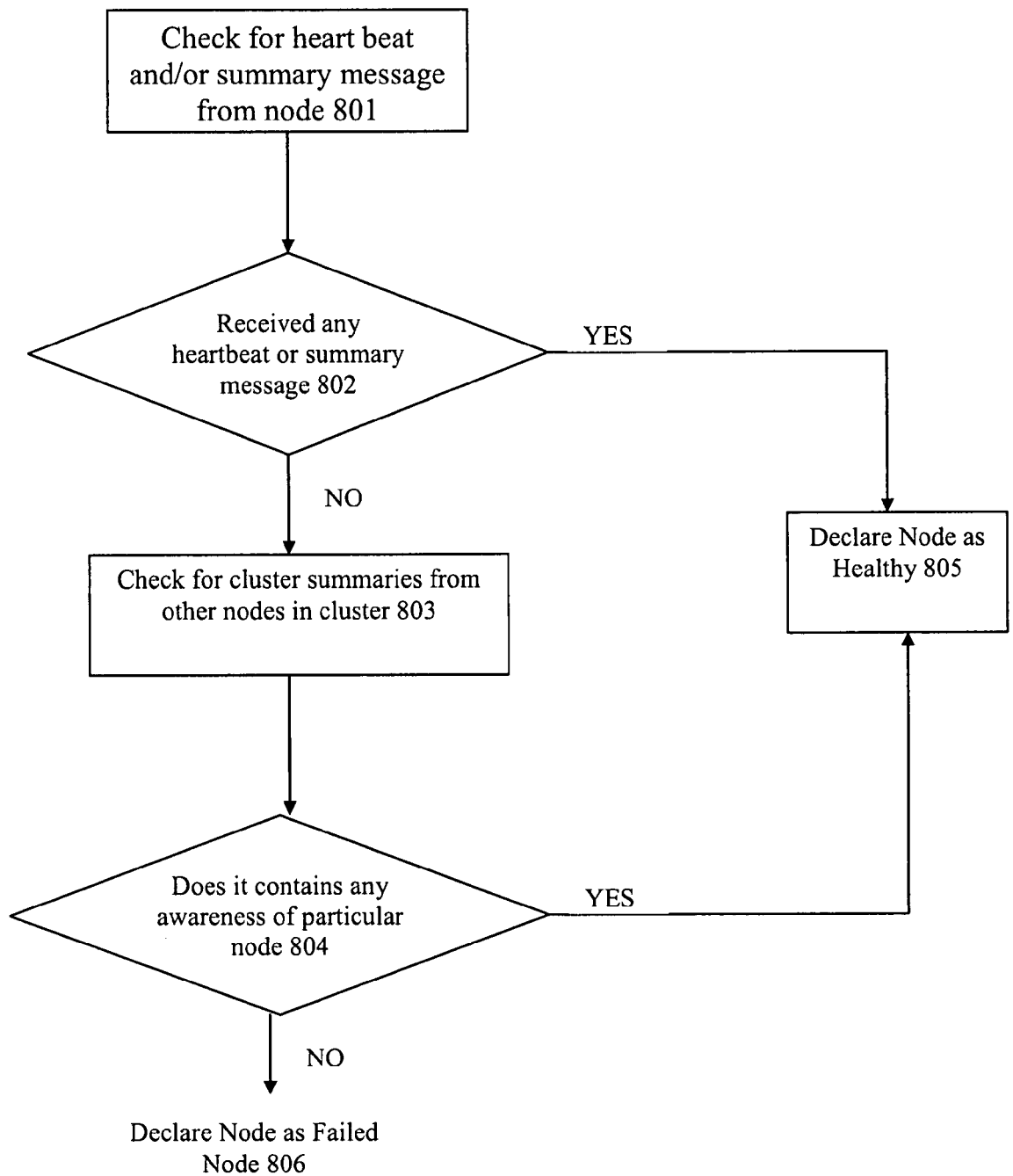
FIG. 8 is a schematic diagram of an algorithm showing the functioning of a transceiver failure detection service (TFDS) device.
Figure 9:
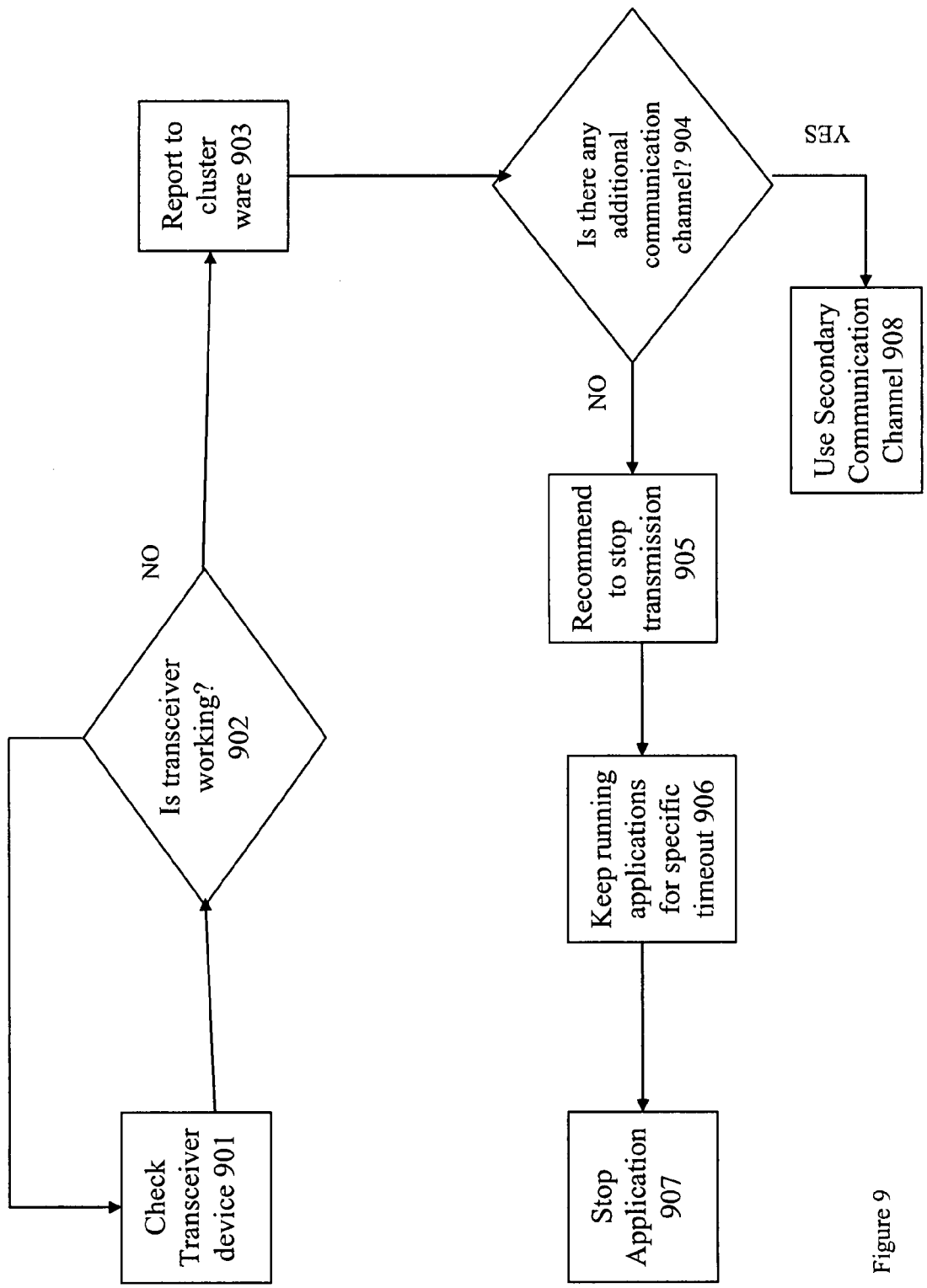
FIG. 9 is a schematic diagram illustrating failure detection algorithm for identifying failed nodes in a cluster.

FIG. 8 shows a flow chart for the failure detection algorithm. Cluster coordinator 501 looks for the heartbeat message from all the nodes in the cluster organization. If there is a direct heartbeat message from a node then it declares that node as healthy and moves on to the next node. If cluster coordinator 501 does not receive any heartbeat message from the node directly then it checks the cluster summaries received for the presence of a heartbeat message from that particular node. If any of the cluster summaries received by cluster coordinator 501 contains the heartbeat message from the node then cluster coordinator 501 declares the node as healthy and moves on to next node. If cluster coordinator 501 doesn't find heartbeat message of the node in any of the cluster summaries received then it declares the node as failed. Hence a node is determined to have failed if and only if:

(i) The cluster coordinator neither receives the heartbeat nor the cluster summary from the node; and (ii) None of the cluster summaries that cluster coordinator 501 received reflects a member awareness of that particular node.

In preferred embodiments, both the above conditions should hold simultaneously for a node to be declared failed. The node may be out of the range of cluster coordinator and unable to directly send heartbeat message and cluster summary message directly to the cluster coordinator 501. In that case the status of node may be received by one of the nodes in the range of original node which in turn will pass on the corresponding message to the cluster coordinator 501 indirectly.

If the node with the cluster coordinator 501 fails, the same failure detection applies for the cluster coordinator as well and the next highest-ranked node is the authority that makes the decision.

The next highest-ranked node when it does not receive any heartbeat or summary message information from the cluster coordinator or does not find the cluster coordinator heartbeat in any other nodes cluster membership summary, it senses that the cluster coordinator has failed. The next highest node then will take over as the new cluster coordinator and reform the cluster excluding the failed nodes.

The following two steps may also be provided as a part of the above algorithm.

The cluster coordinator may periodically exchange detailed health reports that includes memory status, Central Processing Unit (CPU) utilization, network interface card (NIC) status etc. to each of the nodes in order to take proactive measures like reporting to administrator or sending some commands for execution at the node, for instance. The hearing cycle for the sending of this health report is fixed by cluster coordinator for each node in cluster.

Depending upon the situation, any node may raise alerts and/or alarms and can draw the attention of the cluster coordinator to perform corrective measure. If the node is not in direct transmission range of the cluster coordinator, this message may be forwarded by intervening nodes so that it reaches the cluster coordinator. The above messages are transmitted in different logical channels. These channels have their own identity by which they are distinguished from each other easily. These logical channels may share one or more physical channels.

The present technique thus describes a mechanism based on ad hoc wireless network for exchanging messages in a cluster obviating the need for hardware that is not under the control of the nodes themselves. Exploiting the inherent message redundancy in wireless networking, the mechanism provides more efficient and agile fault detection with in a cluster compared to Local Area Network (LAN) based solutions which are more restrictive and failure prone in nature. The present invention also reduces the number of hardware components involved in conventional methods and increases the degree of high availability.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

The invention claimed is:

1. A method of managing nodes in a computer cluster comprising:
   each node repeatedly broadcasting a heartbeat message;
   each node repeatedly receiving a plurality of the heartbeat messages;
   each node repeatedly broadcasting a cluster summary message, wherein the cluster summary message enumerates the nodes from which a heartbeat message was received;
   a cluster coordinator node identifying failed nodes by analyzing cluster summary messages received from other nodes in the cluster; and
   the cluster coordinator node broadcasting an updated cluster organization status, if failed nodes are identified;
   wherein the cluster coordinator node detects a failed node if the cluster coordinator node does not receive a heartbeat message from the failed node; and
   wherein none of the cluster summary messages received by the cluster coordinator node includes the failed node.

2. A method as claimed in claim 1 wherein each nodes generates a cluster summary messages using cluster summary messages received from other nodes.

3. A method as claimed in claim 1 wherein the broadcasts are transmitted using an ad-hoc wireless network.

4. A method as claimed in claim 1 wherein each node broadcasts heartbeat messages comprising that node's identity and health status information.

5. A method as claimed in claim 1 wherein the health status information comprises memory status, central processing unit utilization and network interface card status.

6. A method as claimed in claim 1 wherein if the cluster coordinator node fails a next highest ranked node takes over as cluster coordinator.

7. A method as claimed in claim 1 comprising monitoring a transceiver within each node and, if the transceiver is detected to be faulty, closing a cluster service.

8. A computer cluster comprising:
   a plurality of nodes, each node being arranged to repeatedly broadcast a heartbeat message, receive a plurality of heartbeat messages, broadcast a cluster summary message, wherein the cluster summary message enumerates the nodes from which a heartbeat message was received;
   a cluster coordinator node for identifying failed nodes by analyzing cluster summary messages received from other nodes in the cluster, the cluster coordinator node being arranged to broadcast an updated cluster organization status, if failed nodes are identified;
   wherein the cluster coordinator node detects a failed node if the cluster coordinator node does not receive a heartbeat message from the failed node; and
   wherein none of the cluster summary messages received by the cluster coordinator node includes the failed node.

9. A computer cluster as claimed in claim 8 wherein each node is arranged to generate the cluster summary messages using cluster summary messages received from other nodes.

10. A computer cluster as claimed in claim 8 wherein each node comprises a transceiver for transmitting the broadcasts using an ad-hoc wireless network.

11. A computer cluster as claimed in claim 8 wherein each node broadcasts heartbeat messages comprising that node's identity and health status information.

12. A computer cluster as claimed in claim 11 wherein the health status information comprises memory status, central processing unit utilization and network interface card status.

13. A computer cluster as claimed in claim 8 wherein if the cluster coordinator node fails a next highest ranked node takes over as cluster coordinator.

14. A computer cluster as claimed in claim 8 comprising a transceiver device fault detection service for monitoring a transceiver within each node and, if the transceiver is detected to be faulty, closing a cluster service on the node.

15. A node for a computer cluster comprising:
   means for each node repeatedly broadcasting a heartbeat message;
   means for each node repeatedly receiving a plurality of the heartbeat messages;
   means for repeatedly broadcasting a cluster summary message, wherein the cluster summary message enumerates the nodes from which a heartbeat message was received;
   means for identifying failed nodes by analyzing cluster summary messages received from other nodes in the cluster, and for broadcasting an updated cluster organization status, if failed nodes are identified, when the node is acting as a cluster coordinator node
   wherein the cluster coordinator node detects a failed node if the cluster coordinator node does not receive a heartbeat message from the failed node; and
   wherein none of the cluster summary messages received by the cluster coordinator node includes the failed node.

* * * * *